US 7,076,789 B2

(12) United States Patent
Yanase et al.

(10) Patent No.: US 7,076,789 B2
(45) Date of Patent: Jul. 11, 2006

(54) DISK RECORDING OR PLAYBACK DEVICE HAVING A RETRACTABLE TRAY WITH A POSITIONING MECHANISM FOR PREVENTING A SLIDER FROM INADVERTENTLY MOVING LATERALLY

(75) Inventors: Yasuo Yanase, Osaka (JP); Masahiro Moriyama, Osaka (JP)

(73) Assignees: Sanyo Electric Co., Ltd., Moriguchi (JP); Sanyo Technosound Co., Ltd., Daito (JP)

( * ) Notice: Subject to any disclaimer, the term of this patent is extended or adjusted under 35 U.S.C. 154(b) by 134 days.

(21) Appl. No.: 10/489,858

(22) PCT Filed: Sep. 24, 2002

(86) PCT No.: PCT/JP02/09793

§ 371 (c)(1),
(2), (4) Date: Mar. 23, 2004

(87) PCT Pub. No.: WO03/028031

PCT Pub. Date: Apr. 3, 2003

(65) Prior Publication Data

US 2004/0250266 A1    Dec. 9, 2004

(30) Foreign Application Priority Data

Sep. 26, 2001  (JP)  .............................. 2001-292771

(51) Int. Cl.
*G11B 17/03*  (2006.01)
(52) U.S. Cl. ...................................... 720/601
(58) Field of Classification Search ................. 720/601
See application file for complete search history.

(56) References Cited

U.S. PATENT DOCUMENTS 5,691,969 A * 11/1997 Fujisawa ..................... 720/610
6,341,114 B1 * 1/2002 Nguyen et al. ............. 720/654

FOREIGN PATENT DOCUMENTS

JP         10-199206         7/1998

* cited by examiner

*Primary Examiner*—David Davis
(74) *Attorney, Agent, or Firm*—Armstrong, Kratz, Quintos, Hanson & Brooks, LLP

(57) ABSTRACT

A positioning mechanism for preventing a slider from inadvertently moving laterally comprises a projecting wall provided on a lower surface of a tray and having a first wall extending forward and a second wall extending from the first wall toward a direction orthogonal to the first wall, and at least two projections provided on the slider for holding therebetween the second wall when the tray is in a completely advanced state and the first wall when the tray is in an advancing or a retracting state.

2 Claims, 13 Drawing Sheets

PRIOR ART

PRIOR ART

PRIOR ART

PRIOR ART

DISK RECORDING OR PLAYBACK DEVICE HAVING A RETRACTABLE TRAY WITH A POSITIONING MECHANISM FOR PREVENTING A SLIDER FROM INADVERTENTLY MOVING LATERALLY

TECHNICAL FIELD

The present invention relates to disk recording or playback devices having a retractable tray for placing a disk thereon.

BACKGROUND ART

FIG. 10 is a perspective view of a conventional disk recording or playback device having a tray, and FIG. 11 is a plan view of a conventional chassis 1. The device is a CD (compact disk) player. In the following description, the direction in which the disk is drawn onto a chassis 1 will be referred to as "forward," and the direction in which the disk is ejected from the chassis 1 as "rearward."

Provided on the chassis 1 are a mechanism deck 5 for reproducing signals from a disk D, a slider 3 coupled to the deck 5 and movable laterally, and a drive gear 10 coupled to a motor (not shown). Provided over the mechanism deck 5 and the slider 3 is a tray 4 for placing the disk D thereon. The tray 4 is movable forward and rearward by meshing engagement with the drive gear 10. As is already known, the tray 5 has a large recessed surface 44 for placing a large disk thereon and a small recessed surface 45 for placing a small disk thereon.

The disk D is held between a clamp 8 disposed above the tray 4 on the chassis 1 and a turntable 51 for rotating the disk.

With reference to FIG. 11, the mechanism deck 5 comprises, as mounted on a base 50, the turntable 51 and a pickup 52 movable toward or away from the turntable 51 and having an objective lens 53 for projecting a beam on the rear surface of the disk D. The pickup 52 moves along guide rods 54, 54 provided on the upper surface of the base 50. The beam from the pickup 52 impinges on the disk rear surface through an opening 40 formed in the tray 4. The base 50 is movable upward or downward as supported by a pivot 56 on the chassis 1.

The slider 3 has a pin 39 projecting from its upper surface and fitting in the tray 4. As shown in FIG. 12, the slider 3 is provided at its front end with a vertical plate 31. A cam follower 55 projecting from the base 50 is fitted in a cam slot 36 formed in the vertical plate 31.

FIG. 13 is a rear side view of the tray 4. The rear side of the tray 4 is provide with a rack 41 meshing with the drive gear 10 and a guide groove 49. The pin 39 on the slider 3 is fitted in the guide groove 49 and is restrained from inadvertently shifting laterally relative to the tray 4. The guide groove 49 has a straight portion 49a extending rearward, and an inclined portion 49b extending from the rear end of the straight portion 49a.

FIGS. 15A and 15B are views in section taken along a plane containing the line D—D in FIG. 10. In the state shown in FIG. 15A wherein the tray 4 is completely retracted, the mechanism deck 5 has its rear end moved down about the pivot 56. The tray 4 is advanced from this state by the rotation of the drive gear 10. When the pin 39 is fitted into the inclined portion 49b of the guide groove 49 of the tray 4 from the state shown in FIG. 14, the slider 3 moves leftward with the advance of the tray 4. With the mechanism deck 5 fitting in the cam slot 36 of the slider 3, the mechanism deck 5 is raised to a horizontal position by the movement of the slider 3 as shown in FIG. 15B. The disk D is clamped between the turntable 51 and the clamp 8.

To be satisfactory, the opening 40 of the tray 4 in the conventional device is so sized as to permit the beam from the pickup 52 to pass therethrough. In recent years, however, it is desired that disk recording or playback devices of the type described be reduced in thickness, so that there arises a need to reduce the spacing between the pickup 52 and the tray 4. Consequently, the opening 40 must be enlarged without permitting the guide rods 54 to be positioned below the opening. This entails the objectionable result that no space is available for providing the guide groove 49.

Further for use with DVDs (digital versatile disks) which are higher than CDs in signal recording density, devices are available wherein an objective lens for projecting a CD playback beam and an objective lens for projecting a DVD playback beam are arranged side by side. This arrangement provides an increased spacing between the pickup 52 and the guide rods 54, 54. Accordingly, the tray 4 needs to have an enlarged opening 40 so as to fulfill the need to clear the pickup 52 and the guide rods 54, 54. This leads to the drawback that no space is available for providing the guide groove 49. Without the guide groove 49, the conventional construction would permit the slider 3 to move laterally inadvertently and involve variations in the height of the mechanism deck 5.

An object of the present invention is to restrain the slider from moving laterally inadvertently even if the tray has an enlarged opening.

DISCLOSURE OF THE INVENTION

A positioning mechanism for preventing a slider 3 from inadvertently moving laterally comprises a projecting wall 7 provided on a lower surface of a tray 4 and having a first wall 70 extending forward and a second wall 71 extending from the first wall 70 toward a direction orthogonal to the first wall 70, and at least two projections 32, 33 provided on the slider 3 for holding therebetween the second wall 71 when the tray 4 is in a completely advanced state and the first wall 70 when the tray 4 is in an advancing or a retracting state.

BEST MODE OF CARRYING OUT THE INVENTION

An embodiment of the invention will be described below in detail with reference to the drawings concerned.

Figure 1:
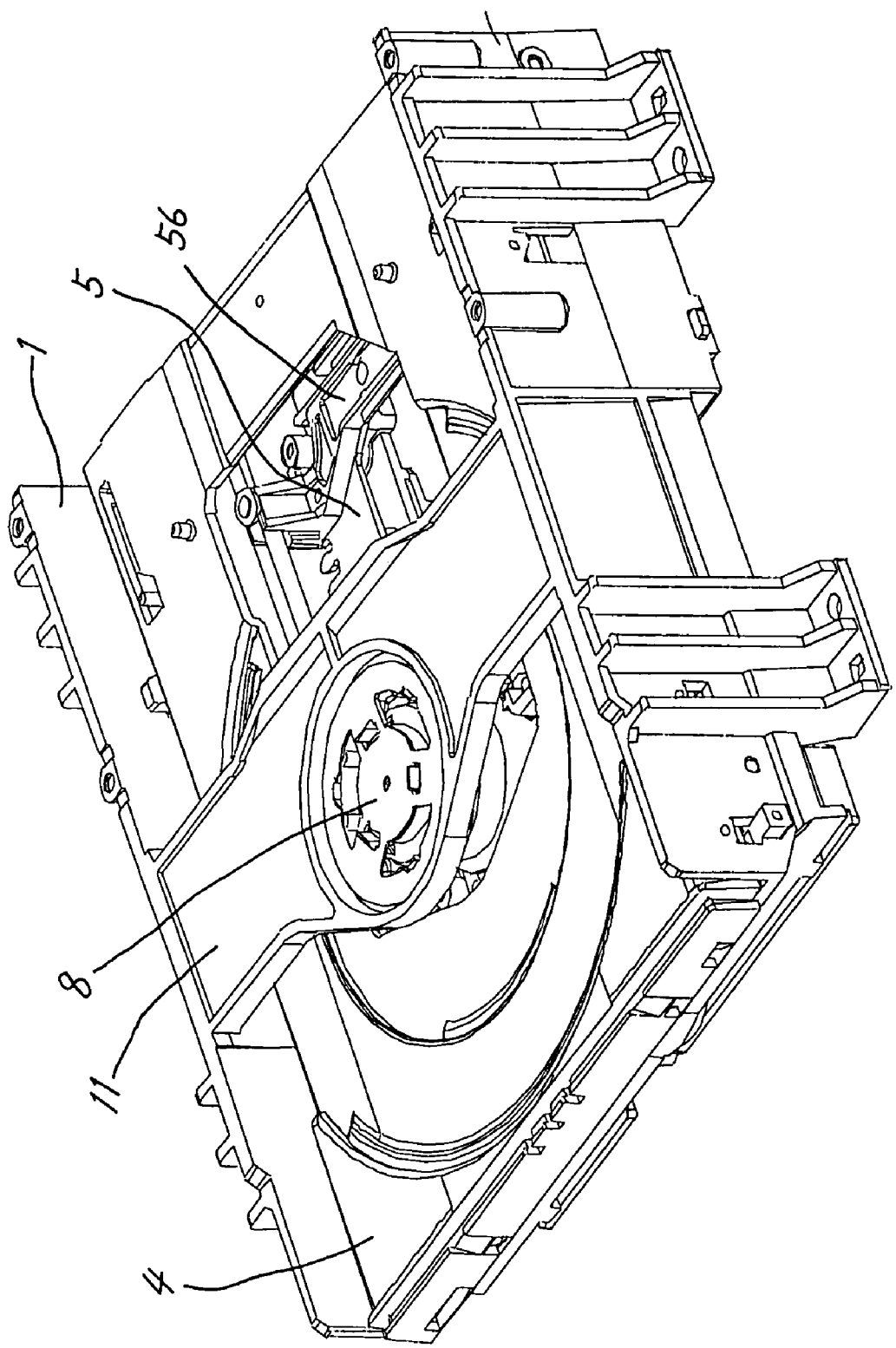
FIG. 1 is a perspective view of a device with a tray in a completely advanced position.
Figure 2:
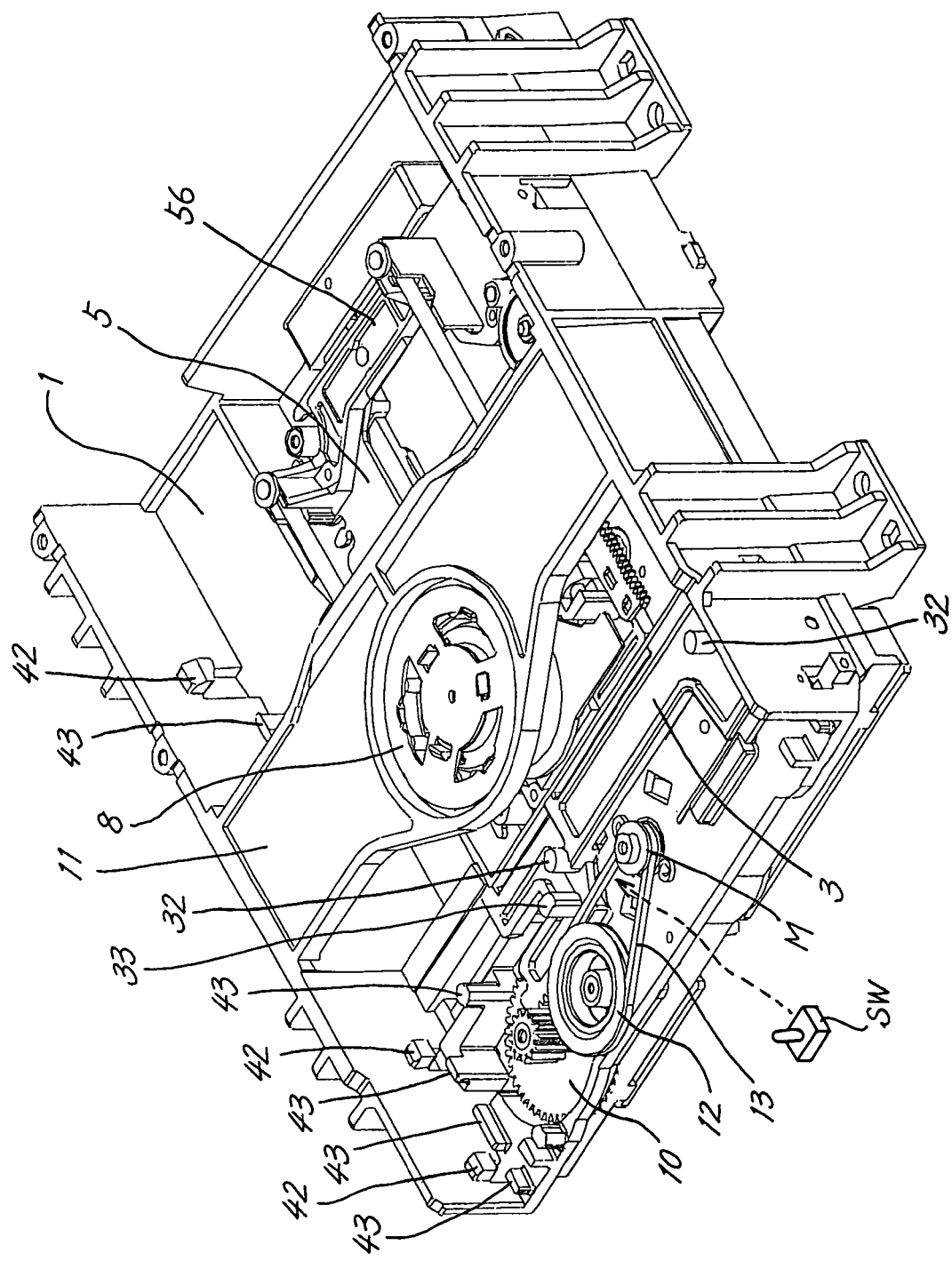
FIG. 2 is a perspective view of the device with the tray omitted.
Figure 3:
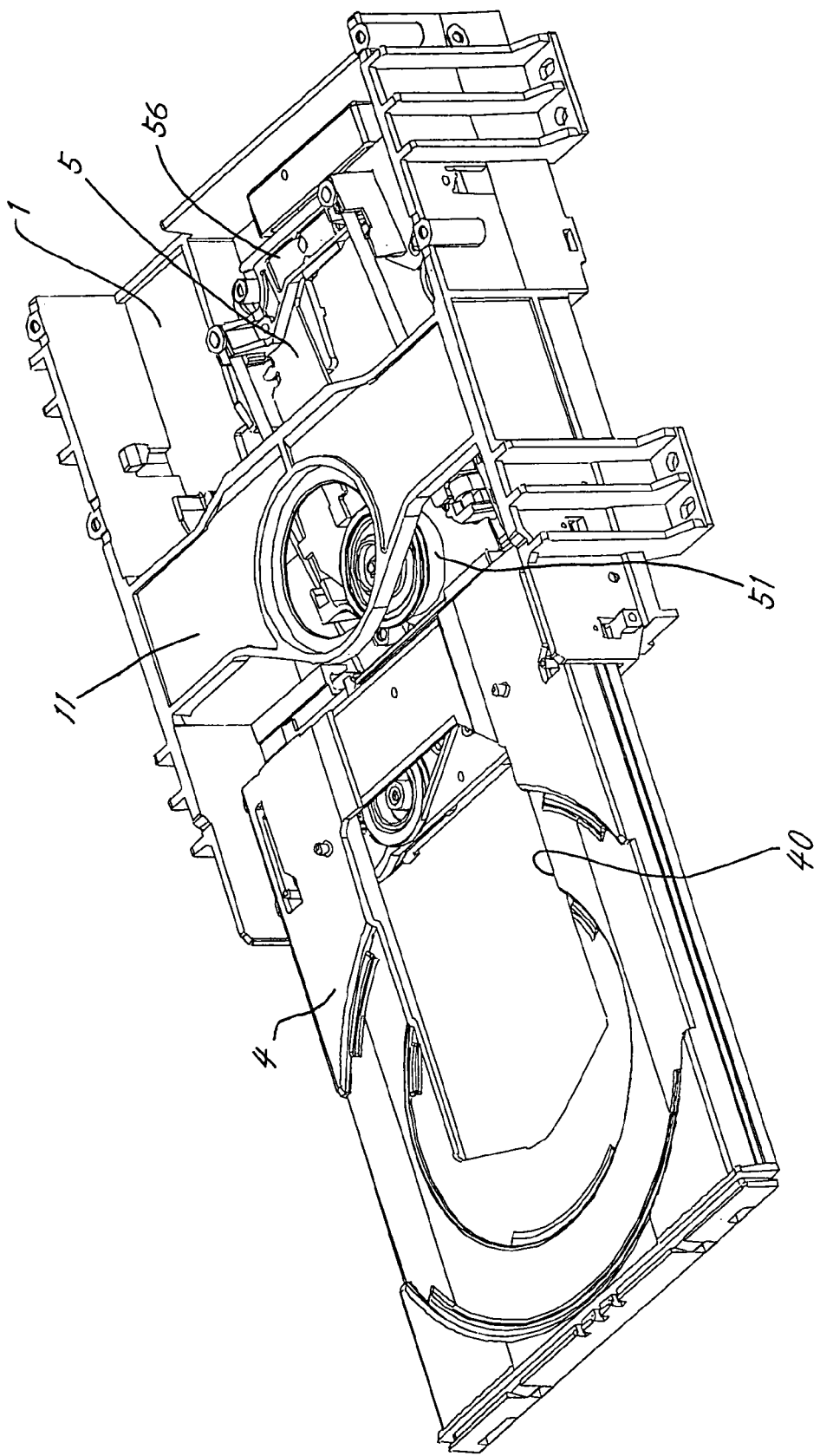
FIG. 3 is a perspective view of the device with the tray in a completely retracted position.
Figure 11:
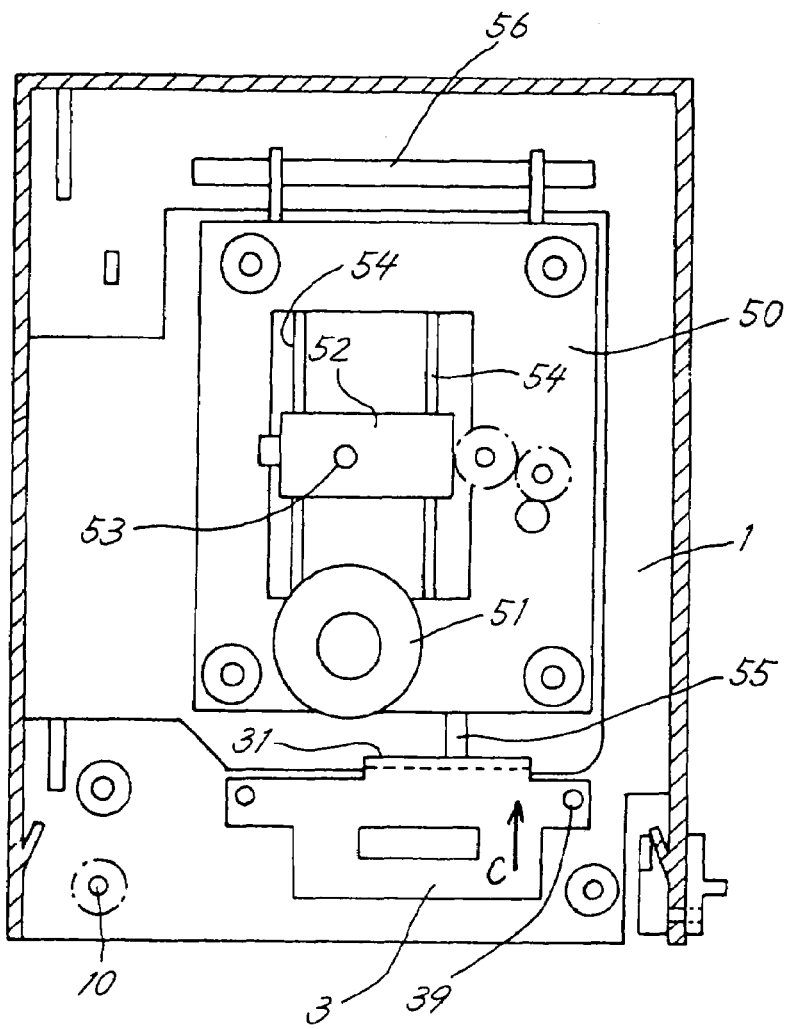
FIG. 11 is a plan view of a conventional chassis.
Figure 12:
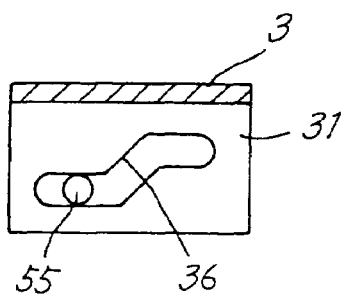
FIG. 12 is a view of a slider shown in FIG. 11 and as viewed from the direction C.
Figure 13:
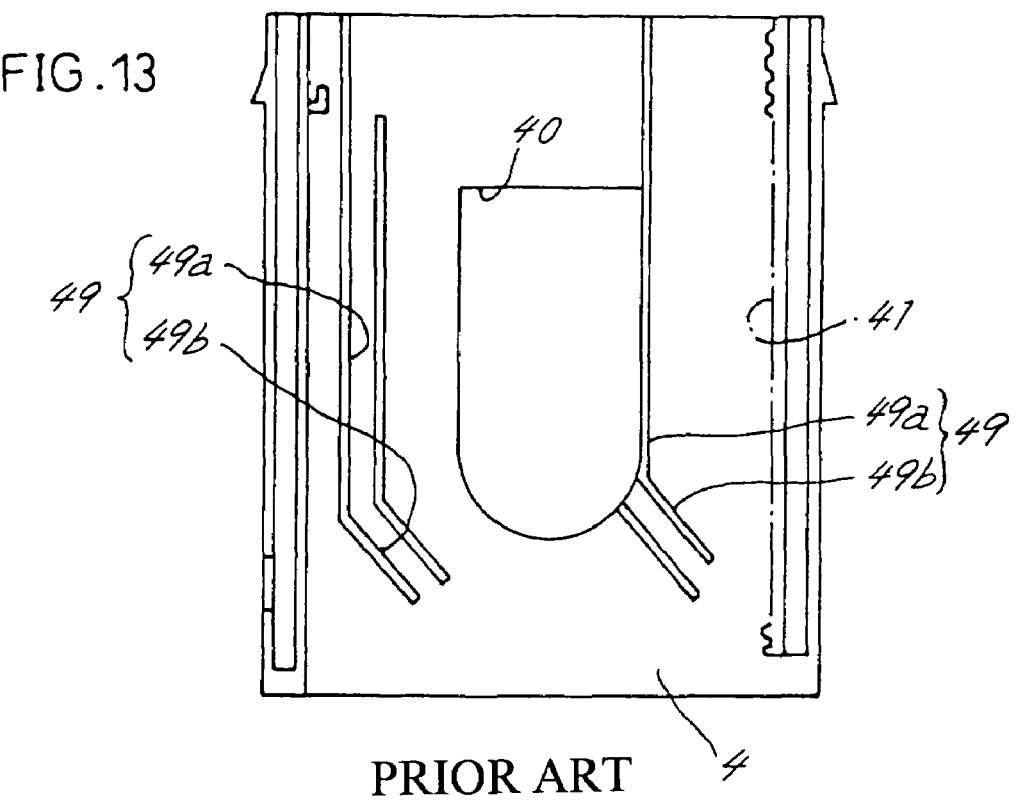
FIG. 13 is a rear side view of the tray.
Figure 14:
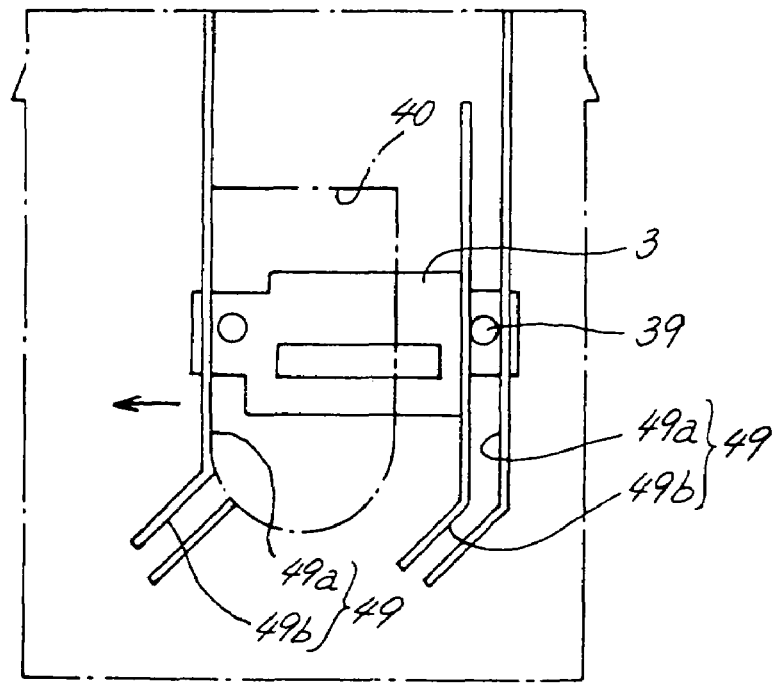
FIG. 14 is a plan view showing the tray as fitted to the slider.

FIG. 1 is a perspective view of a device with a tray 4 in a completely advanced position, and FIG. 2 is a perspective view of the device with the tray 4 omitted. FIG. 3 is a perspective view of the device with the tray 4 in a completely retracted position, the view not showing the clamp 8 to be described below. As in the prior art, a mechanism deck 5 has a turntable 51 and a pickup 52 and is movable upward and downward about a pivot 56 on a chassis 1 (see FIG. 11). Provided above the chassis 1 is a clamp support plate 11 positioned above the tray 4 and integral with the chassis 1. The clamp 8 for holding a disk between the turntable 51 and the clamp 8 is provided on the support plate 11 and is movable upward and downward by a very small amount relative to the plate 11. The clamp 8 has a known construction and will not be described in detail.

With reference to FIG. 2, the chassis 1 has mounted thereon a drive gear 10 rotatable by a motor M by way of an intermediate pulley 12 and a belt 13. The drive gear 10 is in mesh with the tray 4 as will be described below.

Each side wall of the chassis 1 is provided with upper support pieces 42, 42 and lower support pieces 43, 43, and the tray is disposed between the upper support pieces 42, 42 and the lower support pieces 43, 43. A slider 3 is laterally movably provided on the chassis 1. Upwardly projecting from the slider 3 are two first projections 32, 32 which are away from each other and a second projection 33.

Figure 4:
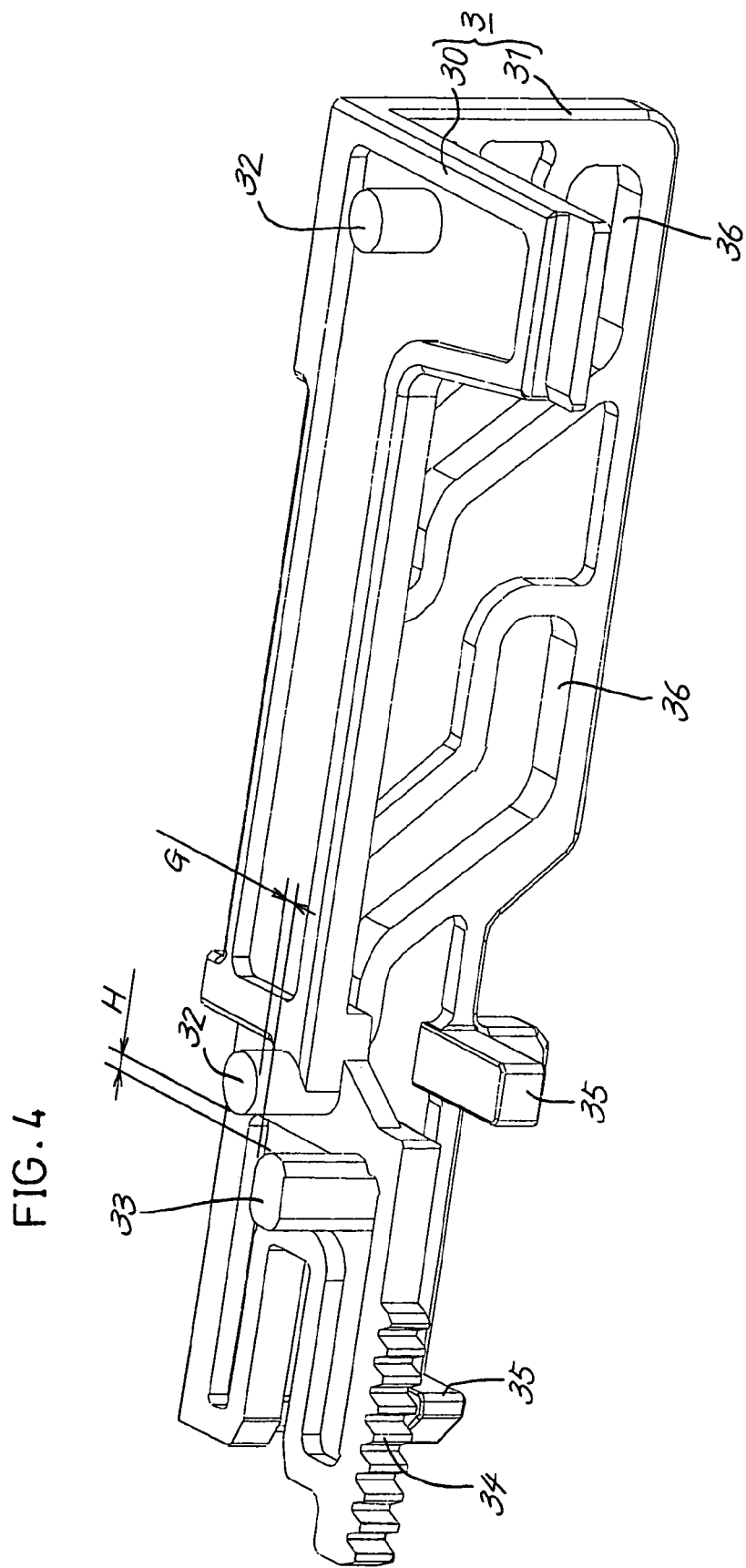
FIG. 4 is a perspective view of a slider.

FIG. 4 is a perspective view of the slider 3. The slider 3 comprises a horizontal plate 30, and a vertical plate 31 extending downward from the front end of the plate 30. One of the first projections 32 and the second projection 33 are spaced apart on the horizontal plate 30 by a clearance H laterally of the device and by a clearance G forwardly or rearwardly thereof. As will be described later, a projecting wall 7 of the tray 4 fits in the clearance H or G. The second projection 33 is flat on the front side and rear side thereof, while both the projections 32, 33 may be made flat on the front side and rear side thereof.

The horizontal plate 30 has a rack 34 in mesh with the drive gear 10. Two switch pushing lugs 35, 35 which are away from each other are provided below the rack 34. These lugs 35, 35 are positioned under the chassis 1 for pushing a sensor switch SW (see FIG. 2) attached to the lower side of the chassis 1.

The vertical plate 31 has cam slots 36, 36 for respective cam followers 55, 55 (see FIG. 11) on a base 50 to fit in. When the slider 3 moves laterally, the mechanism deck 5 fitting in the cam slots 36, 36 moves upward or downward. Only one cam slot 36 or at least two cam slots 36 may be provided.

Figure 5:
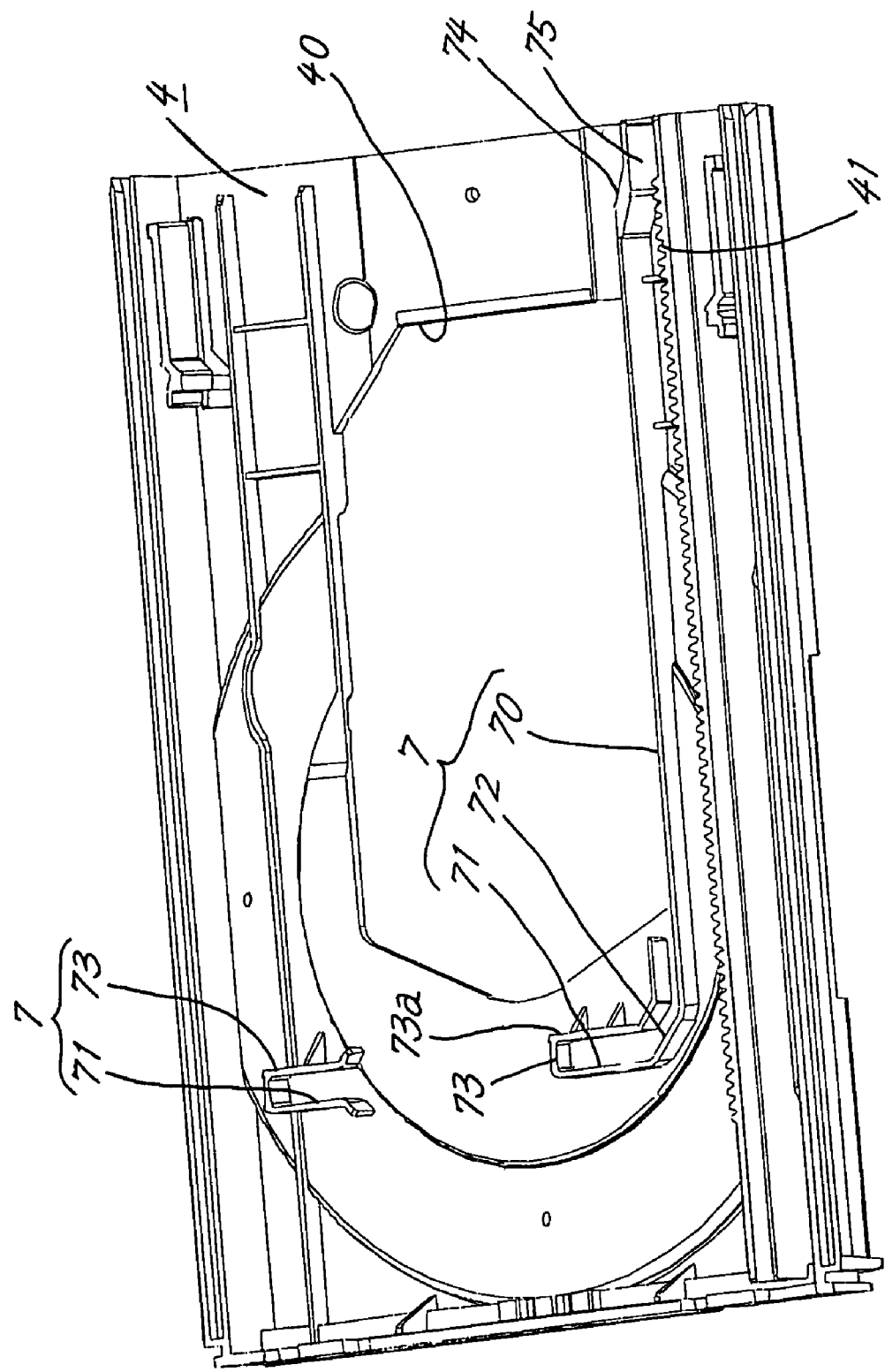
FIG. 5 is a perspective view of the tray as it is seen from below.
Figure 6:
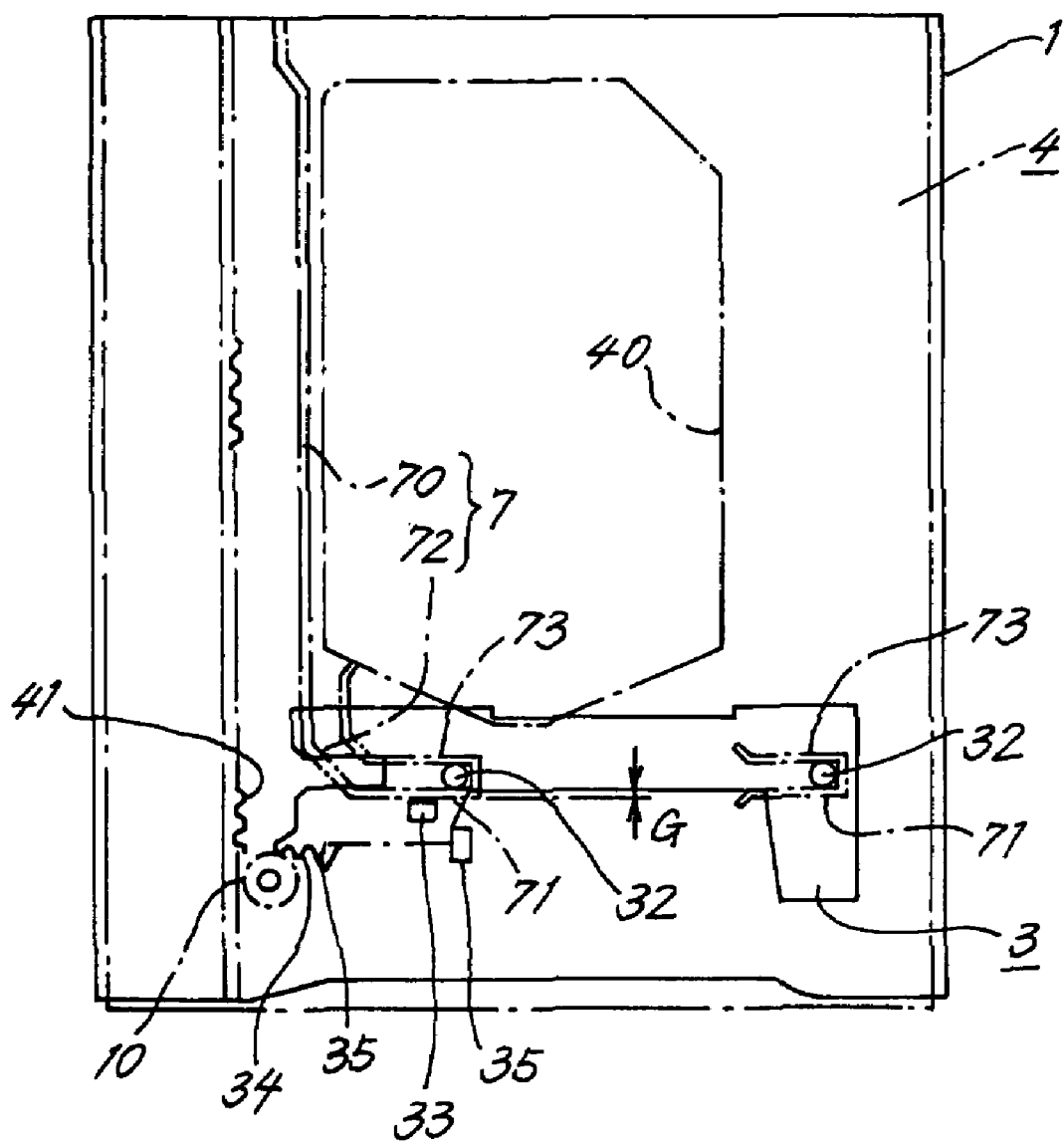
FIG. 6 is a plan view of the tray as completely advanced.

FIG. 5 is a perspective view of the tray 4 as it is seen from below. The tray 4 has a larger opening 40 than conventionally, and the pickup 52 and guide rods 54 (see FIG. 11) are fittable thereinto. The tray 4 has two projecting walls 7, 7 at respective side portions thereof. One of the projecting walls 7 has a first wall 70 extending forward, a slanting wall 72 extending from the rear end of the first wall 70 and slanting rearwardly inward, and a second wall 71 extending from the rear end of the slanting wall 72 toward a direction orthogonal to the first wall 70. The end of the second wall 71 opposite to the slanting wall 72 is closed with a cover wall 73 joined to the second wall 71. The first wall 70 has a front end portion which comprises a cam wall 74 slanting outward and a third wall 75 extending from the front end of the cam wall 74 and generally parallel to the first wall 70. The other projecting wall 7 comprises a second wall 71 and a cover wall 73 and has an open inner end. Provided on the rear side of the tray 4 outwardly of the first wall 70 of the first-mentioned projecting wall 7 is a rack 41 extending forward to mesh with the drive gear 10.

Figure 15A:
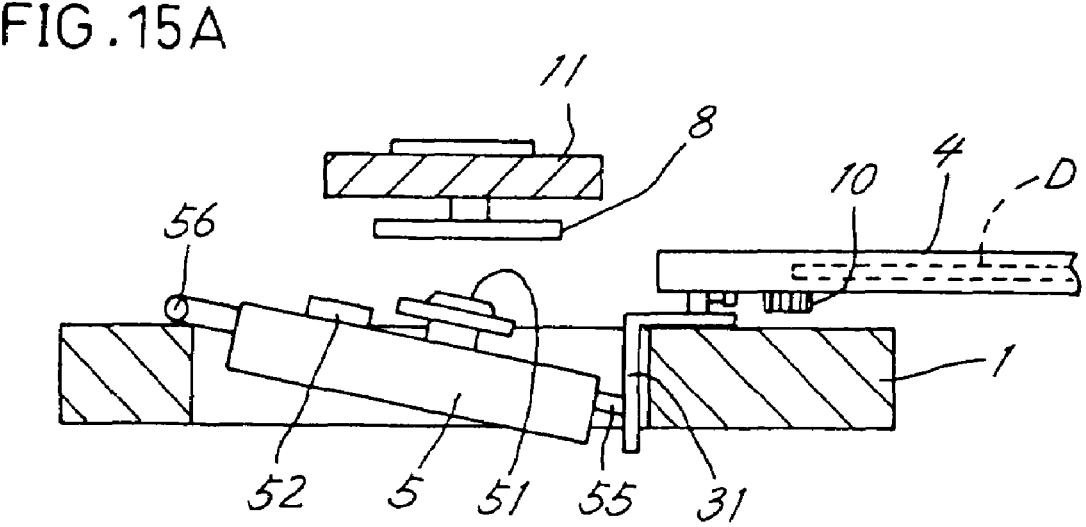
FIGS. 15A and 15B are views in section taken along a plane containing the line D—D in FIG. 10.
Figure 15B:
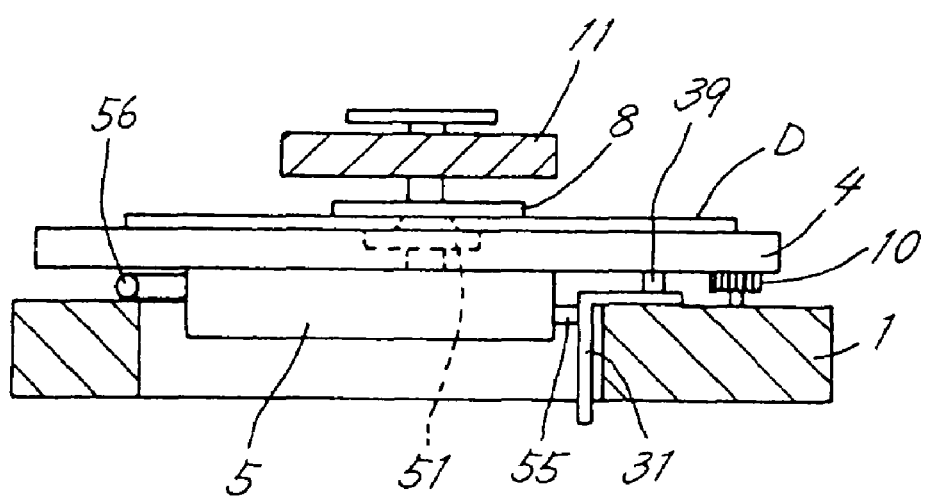

With the tray 4 in a completely advanced position, signals can be recorded on or reproduced from a disk. As in the prior art and as shown in FIG. 15B, the mechanism deck 5 is moved upward to a horizontal position by the movement of the slider 3, the turntable 51 raises the disk D, and the clamp 8 and the turntable 51 clamp the disk D therebetween. Through the opening 40 of the tray 4, a beam is projected onto the rear surface of the disk from pickup 52.

[Retraction of the Tray]

The tray 4 is retracted from the completely advanced position in the manner to be described below with reference to the plan views of FIGS. 6 to 9. For the convenience of illustration, the mechanism deck 5 is not shown in FIGS. 6 to 9. In the state shown in FIG. 6 wherein the tray 4 is completely advanced, the second wall 71 fits in the clearance G between the left first projection 32 on the slider 3 and the second projection 33 thereon. In the state of the tray 4 as completely advanced, the second wall 71 is held between the first and second projections 32, 33, and the first projection 32 is held in a groove defined by the second wall 71 and wall 73a, so that even if the device is subjected to an impact as by falling, the load of impact is received by the two projections 32, 33 and the walls 71, 73a. Thus, the impact load is dividedly received by the two projections 32, 33 and the two walls 71, 73a. This reduces the likelihood of the projections 32, 33 breaking. Especially, the portion of the second projection 33 in contact with the second wall 71 has a flat face, so that the load per unit area is small, further diminishing the likelihood of the second projection 33 breaking.

The left switch pushing lug 35 pushes the sensor switch SW (see FIG. 2), whereby the tray 4 as brought to the completely advanced position is detected. The rack 34 of the slider 3 meshes with the drive gear 10, while the rack 41 of the tray 4 is out of meshing engagement with the drive gear 10.

Figure 7:
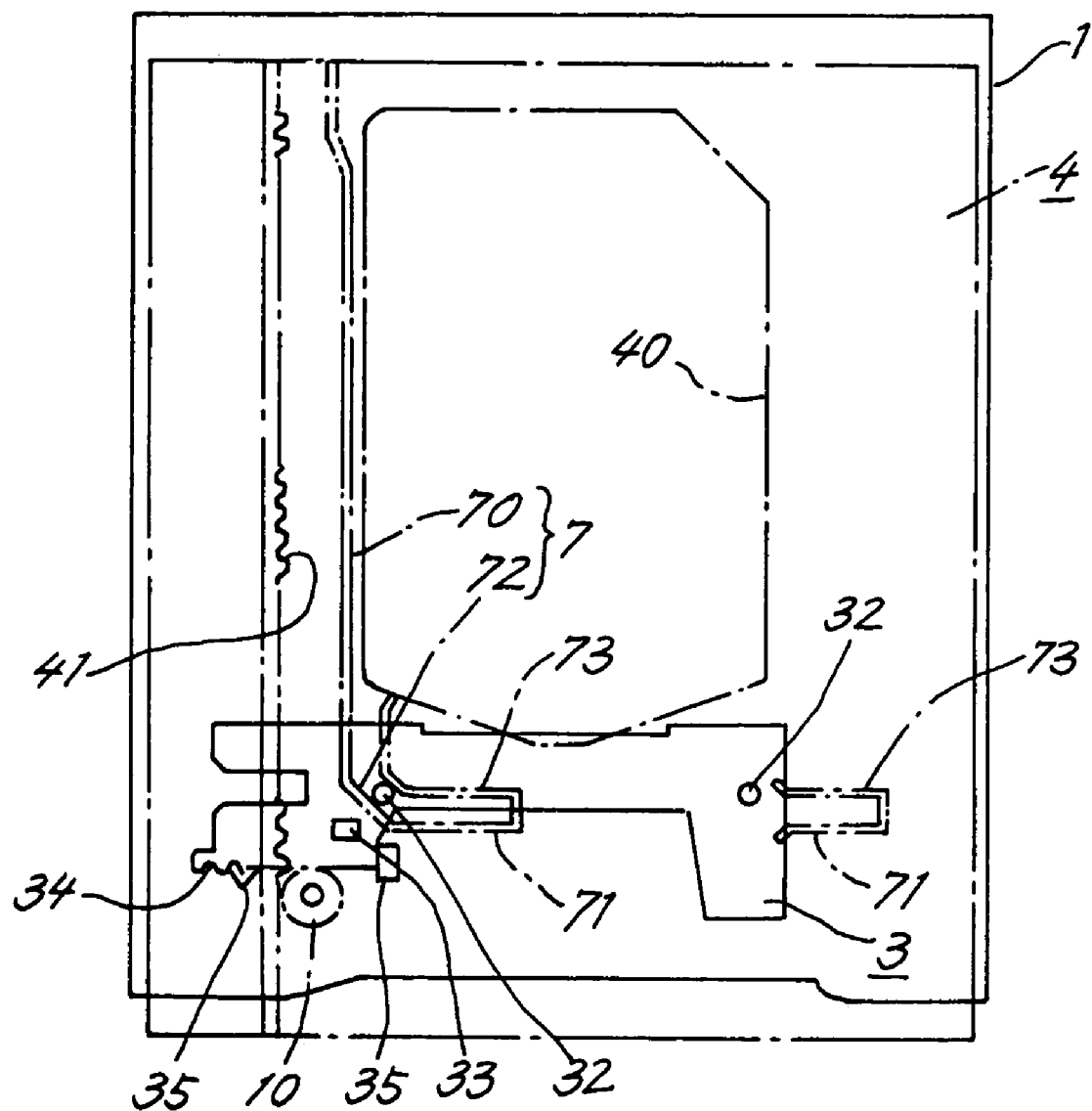
FIG. 7 is a plan view showing the tray in a retracting movement from the completely advanced position.

The drive gear 10 rotates counterclockwise with the tray 4 in its completely advanced position. The slider 3 moves leftward, the right second projection 32 leaves the second wall 71, and the left first projection 32 comes into contact with the slanting wall 72 as shown in FIG. 7. This first projection 32 pushes the tray 4 rearward, meshing the rack 41 of the tray 41 with the drive gear 10.

Figure 8:
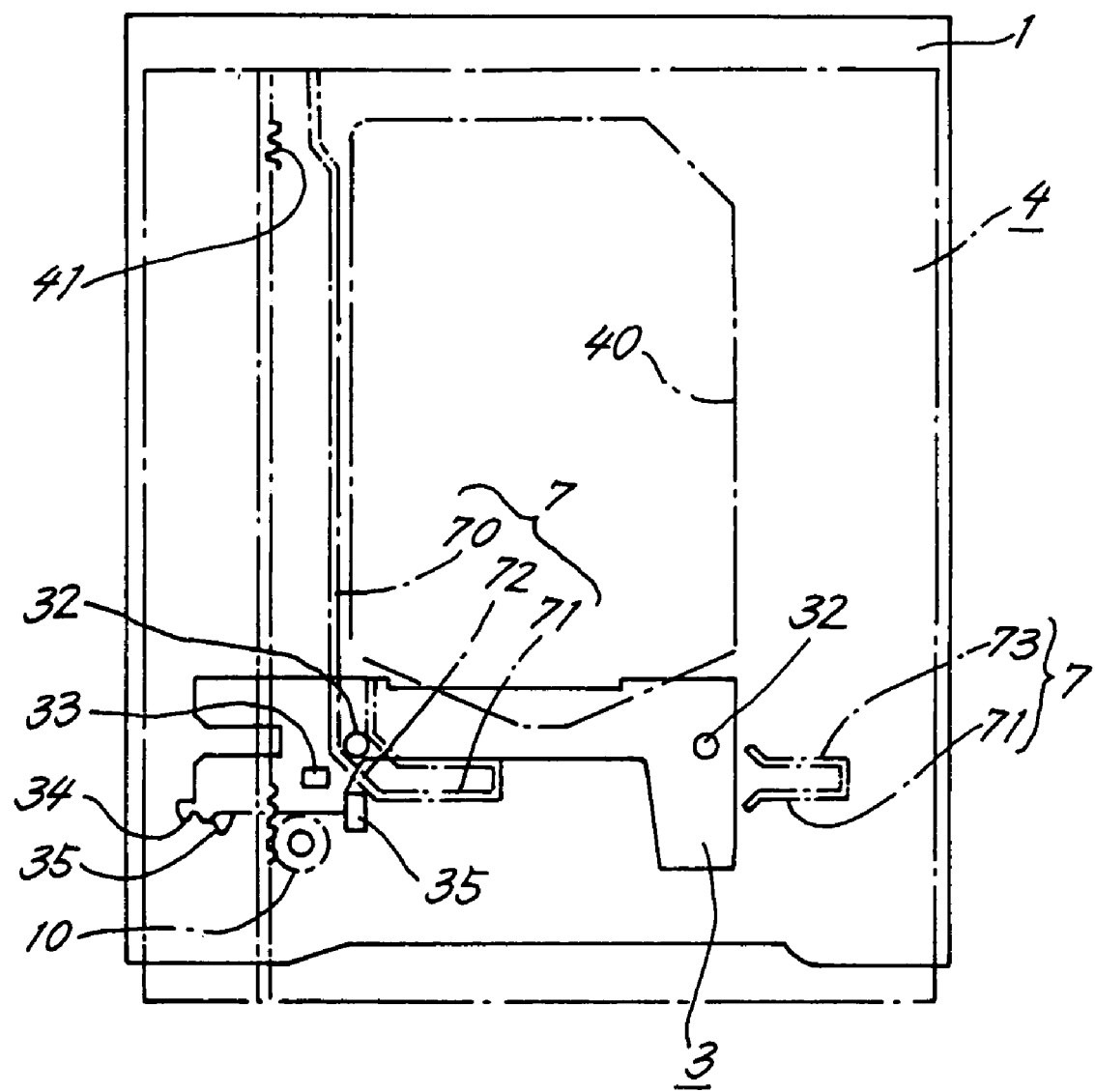
FIG. 8 is a plan view showing the tray in the retracting movement.

The drive gear 10 further rotates, retracting the tray 4 further rearward and causing the first projection 32 to move the slider 3 leftward by contact with the slanting wall 72 as shown in FIG. 8. The rack 34 of the slider 3 is disengaged from the drive gear 10 to temporarily halt the slider 3.

Figure 9:
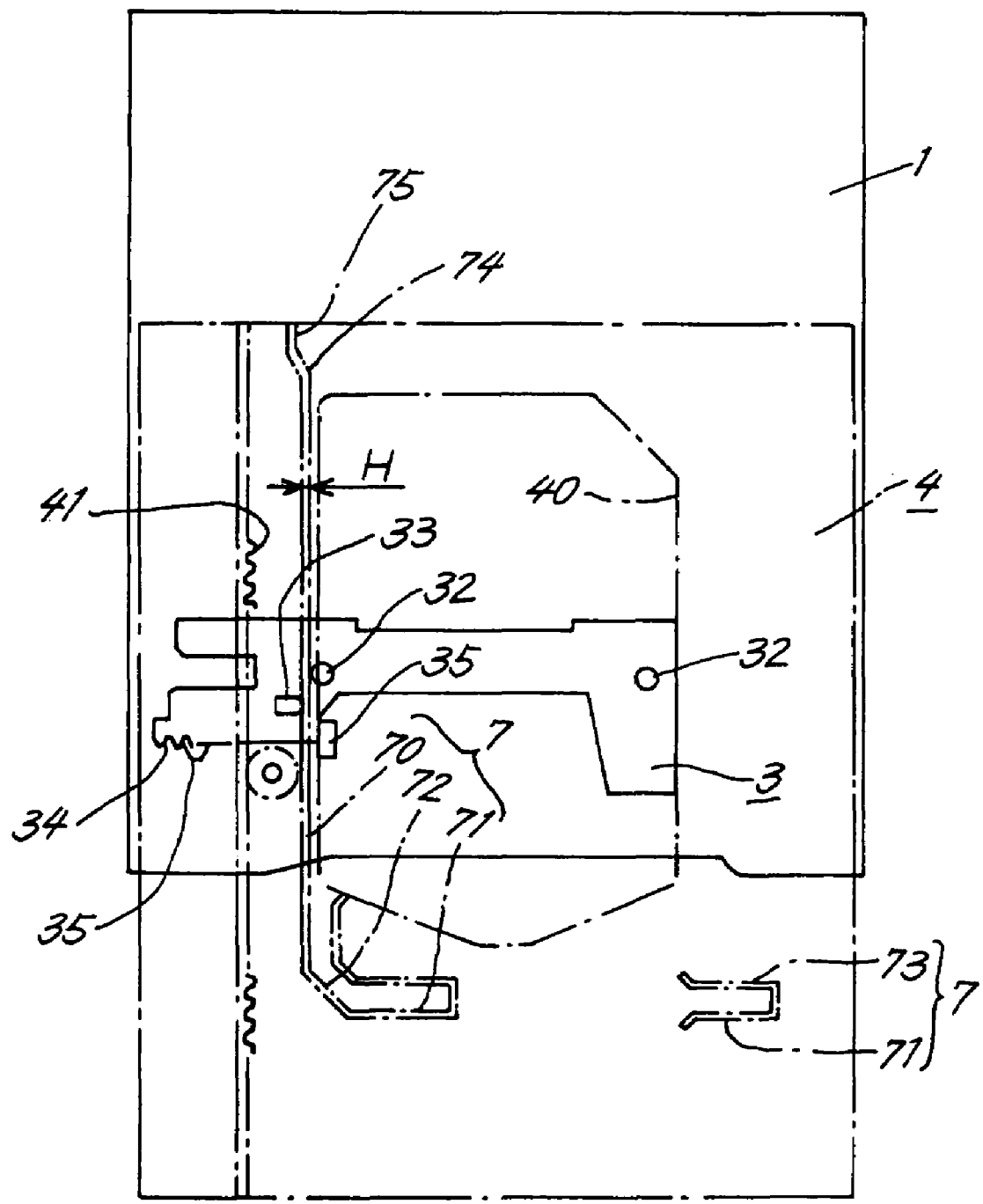
FIG. 9 is a plan view showing the tray in the retracting movement.
Figure 10:
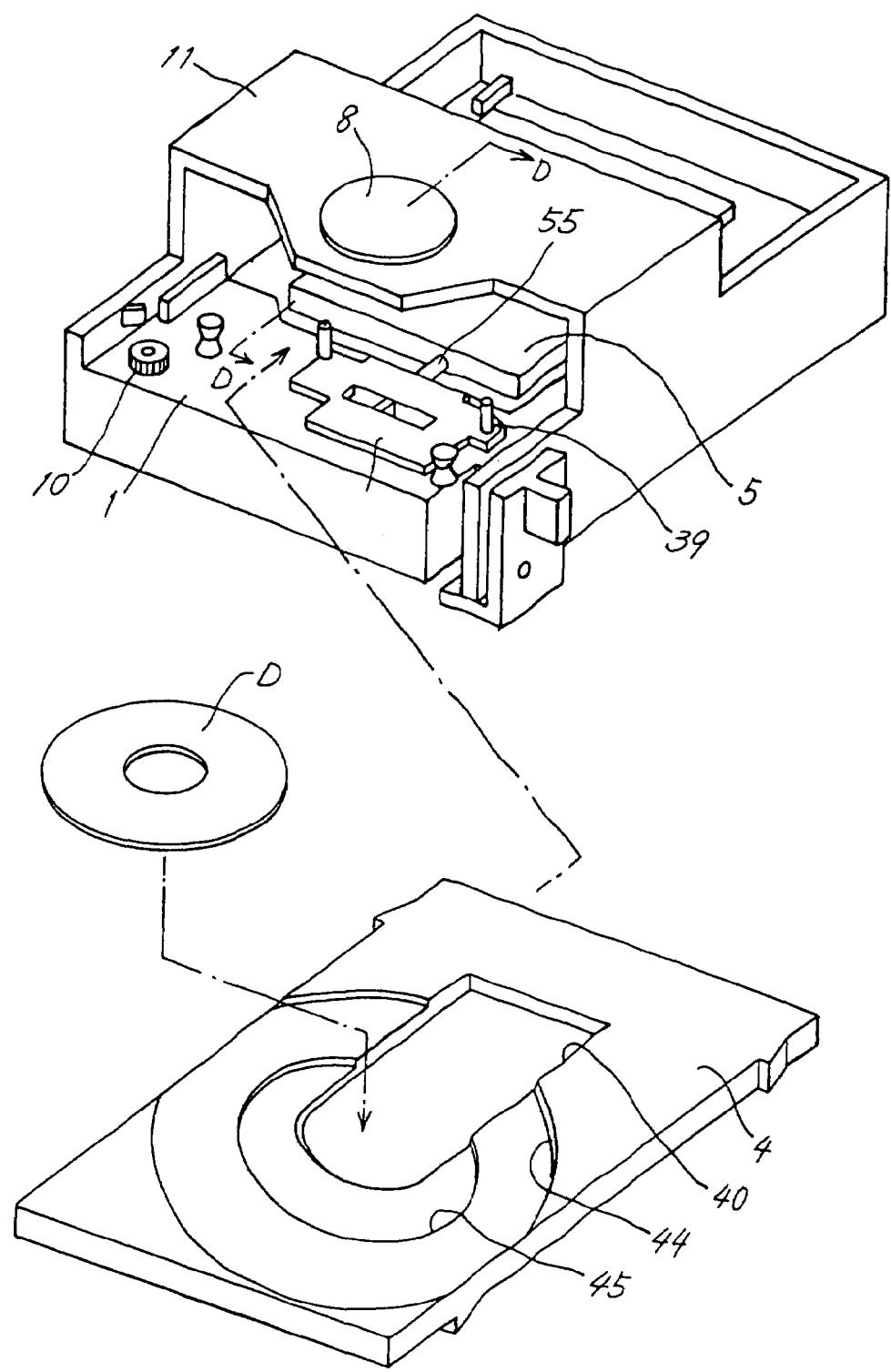
FIG. 10 is a perspective view of a disk recording or playback device having a tray and previously proposed by the present applicant.

When the drive gear 10 further rotates, the tray 4 is further retracted. The tray 4 is retracted with the first wall 70 fitting in the clearance H between the first projection 32 and the second projection 33 as shown in FIG. 9. This prevents the slider 3 from moving leftward or rightward inadvertently.

Upon the two projections 32, 33 reaching the cam wall 74 and the third wall 75, the slider 3 moves outward again. The right switch pushing lug 35 pushes the sensor switch SW, whereby the tray 4 as brought to a completely retracted position is detected. The drive gear 10 is brought out of rotation. When the tray 4 advances, a movement reverse to the above is conducted, so that the advance movement will not be described in detail.

The slider 3 is positioned in place by the slider projections 32, 33 holding the first wall 70 of the tray 4 therebetween. Although the tray 4 has the guide groove 49 for positioning the slider 3 in place with respect to the lateral direction in the prior art, the first wall 70 is provided on the tray 4 according to the present invention, so that the area to be occupied by the component of the positioning mechanism to be provided on the tray 4 for the slider 3 can be smaller. Accordingly, the slider 3 can be positioned in place with respect to the lateral direction although the opening 40 has an increased size.

INDUSTRIAL APPLICABILITY

With the tray 4 in its completely advanced position, the projections 32, 33 on the slider 3 hold the first wall 70 of the tray 4 therebetween, whereby the slider 3 is positioned in place with respect to the lateral direction. Although the tray 4 of the prior art has a guide groove 49 for positioning the slider 3 in place, the tray 4 of the invention has the first wall 70. This reduces the space to be occupied by the component of the positioning mechanism provided on the tray for positioning the slider 3. The slider 3 can therefore be positioned in place although the tray has a large opening 40.

Further with the conventional device, a single pin 39 is fitted in the guide groove 49 for positioning the slider 3 in place, whereas when the device is subjected to an impact as by falling with the tray in its completely advanced position, the entire load of impact is applied to the single pin 39 to possibly break the pin 39. According to the invention, the two projections 32, 33 hold the second wall 71 therebetween with the tray 4 in its completely advanced position, so that even if the device is subjected to an impact as by falling, the impact is received by the two projections 32, 33 and the two walls 71, 73*a*. Thus, the impact load is dividedly received by the two projections 32, 33 and the two walls 71, 73*a* unlike the prior art. This reduces the likelihood of the projections 32, 33 and the walls 71, 73*a* breaking.

The invention claimed is:

1. A disk recording or playback device having as provided on a chassis a tray movable forward and rearward for placing a disk D thereon, a slider movable as coupled to the tray, and a mechanism deck comprising a turntable for rotating the disk D and movable upward and downward as coupled to the slider, a positioning mechanism being provided between the tray and the slider for preventing the slider from inadvertently moving laterally, the disk recording or playback device being characterized in that the positioning mechanism comprises a projecting wall provided on a lower surface of the tray and having a first wall extending forward and a second wall extending from the first wall toward a direction orthogonal to the first wall, and at least two projections provided on the slider, the two projections being spaced apart by clearance H laterally of the device and by clearance G forwardly or rearwardly of the device, the second wall fits in the clearance G when the tray is in a completely advanced state, and the first wall fits clearance H when the tray is in an advancing or a retracting state.

2. A disk recording or playback device according to claim 1 wherein at least one of the projections is flat at a portion thereof to be brought into contact with the second wall.

* * * * *